United States Patent
Dribinsky

(10) Patent No.: US 8,698,543 B1
(45) Date of Patent: Apr. 15, 2014

(54) INTERFACE TO A SERIAL COMMUNICATIONS BUS

(71) Applicant: Memsic, Inc., Andover, MA (US)

(72) Inventor: Alexander Dribinsky, Naperville, IL (US)

(73) Assignee: Memsic, Inc., Andover, MA (US)

( * ) Notice: Subject to any disclaimer, the term of this patent is extended or adjusted under 35 U.S.C. 154(b) by 0 days.

(21) Appl. No.: 13/780,693

(22) Filed: Feb. 28, 2013

(51) Int. Cl.
*H03L 5/00* (2006.01)

(52) U.S. Cl.
USPC .......................................................... 327/333

(58) Field of Classification Search
CPC .......................................... H03K 19/018521
USPC .......................................................... 327/333
See application file for complete search history.

(56) References Cited

U.S. PATENT DOCUMENTS

2006/0227900 A1 * 10/2006 Mizunaga et al. ............. 375/317

OTHER PUBLICATIONS

Wikipedia; "Serial Peripheral Interface Bus"; 13 pages; at least as early as Feb. 8, 2013.
Wikipedia; "I²C"; 15 pages; at least as early as Nov. 27, 2012.
Wikipedia; "I2C.Svg"; en:user:Cburnett; 4 pages; Dec. 17, 2006.
Freescale Semiconductor; "Using the I²C Bus with HCS12 Microcontrollers"; Grant M. More; 2004.
Philips Semiconductors; "The I²C-bus and how to use it (including specifications)"; Apr. 1995.
Microchip Technology; "Section 18. Serial Peripheral Interface (SPI)"; 2007-2011.
VTI Technologies; "SPI Interface Specification"; Sep. 19, 2005.
Microchip Technology; "SPI—Overview and Use of the PICmicro Serial Peripheral Interface"; Date unknown.

* cited by examiner

*Primary Examiner* — Daniel Rojas
(74) *Attorney, Agent, or Firm* — Preti Flaherty Beliveau & Pachios LLP

(57) ABSTRACT

An interface within an electronic device coupled to a serial communications bus having one or more serial communications lines generates a reference voltage source within the electronic device from the logic signals carried on the serial communications line(s). The generated reference voltage source is used within the electronic device to decode the logic signals received from the serial communications line(s).

19 Claims, 3 Drawing Sheets

US 8,698,543 B1

INTERFACE TO A SERIAL COMMUNICATIONS BUS

CROSS REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to an interface to a serial communications bus, and more specifically, to an interface to a serial communications bus having one or more serial communications lines.

BACKGROUND OF THE INVENTION

Serial communications buses are commonly used to facilitate the transport of data and clock signals from one device to another device over one or more serial communications lines that make up the bus. The Inter-Integrated Circuit ($I^2C$) is a two-wire serial bus that is used to interconnect low speed electronic peripherals such as motherboards, processors, cellphones, analog to digital converters, digital to analog converters or other electronic devices.

A block diagram depicting an exemplary $I^2C$ system is illustrated in FIG. 1. As illustrated, the $I^2C$ serial communications bus employs two bidirectional serial lines; namely, a Serial Data Line (SDA) and a Serial Clock Line (SCL). The SDA and SCL lines are each coupled to a voltage Vdd via respective pull-up resistors R1 and R2. The serial clock and data lines are pulled down by open drain or open collector transistors located on one of the connected devices in accordance with the applicable signaling protocol. The $I^2C$ protocol is well known in the art and for that reason is not discussed further herein. $I^2C$ systems may include one or more masters and one or more slave devices coupled to the SDA and SDL lines. Typically the voltage Vdd is between 1.2 and 3.3 volts. Other voltages for Vdd may be employed.

When the SDA and SCL lines are not used for communication, these lines are pulled up to Vdd by the respective pull-up resistors. The electronic devices connected to the SDA and SCL lines of the serial communications bus, however, may employ supply voltages that are greater than or equal to the voltage Vdd. In order for the master or slave devices to properly interpret the signals on the SDA and SCL lines, they need to know the magnitude of the Vdd voltage. Typically, this is accomplished by providing a direct electrical connection from the voltage Vdd to a pin on an integrated circuit package containing the integrated circuit for the serial communications bus interface. The input circuitry within the interface circuit on the master or slave device, as applicable, uses the voltage Vdd to interpret the logic levels on the SDA and SCL lines.

It is costly to provide a dedicated connection from the voltage Vdd to an integrated circuit that provides the $I^2C$ interface for several reasons. First, a dedicated connection on an integrated circuit for the Vdd voltage connection requires additional area on the semiconductor device. Second, a dedicated connection for Vdd, requires another pin in the semiconductor package which may in turn require a larger package than might otherwise be required.

For the above reasons, it would be desirable to provide an integrated circuit in the form of an interface to a serial communications bus that avoids the above-described disadvantages.

SUMMARY OF THE INVENTION

An improved interface to a serial communications bus utilizing a first DC voltage source provides a mechanism for interfacing electronic devices to the serial communications bus. The electronic devices are powered by voltage sources that provide a DC voltage that is typically greater than or equal to the voltage provided by the first DC voltage source. The interface between the serial communications bus and the electronic devices coupled thereto is achieved without providing a direct electrical connection between the first DC voltage source and the respective electronic devices.

In one embodiment of a serial communications bus known as the $I^2C$, two serial communications lines SCL and SDA are provided and each is coupled via a pull-up resistor to a voltage rail having a voltage Vdd provided by the first DC voltage source. The SCL and SDA lines are pulled low using open drain/open collector transistors located within the electronic devices when the lines are in a first logic state, and are pulled high to the voltage Vdd through respective pull-up resistors when in the second logic state.

The electronic devices are each powered by a DC voltage source that provides a voltage that is greater than or equal to the voltage Vdd. To properly decode the signals on the SCL and SDA lines of the serial communications bus, each of the electronic devices must know the magnitude of the DC voltage Vdd. To avoid the need to provide an additional connection on an integrated circuit and an associated pin on an integrated circuit package for connection to the first DC voltage source, the electronic devices employ a peak detector to generate a DC voltage reference that approximates the voltage Vdd. The peak detector includes transistors having gates electrically coupled to the SCL and SDA communications lines. The sources of the transistors are coupled to a capacitor in a source follower configuration. When the gates of the transistors are pulled high by the respective pull-up resistors, the sources of the respective transistors charge the capacitor to a voltage Vcap, which serves as the DC reference voltage on the respective electronic device.

Schmidt triggers receive and recover the logic signals on the SCL and SDA serial communications lines and the DC reference voltage Vcap is used as the voltage source for the Schmidt triggers. Each Schmidt trigger has an output that is coupled to the input of a level shifter.

The level shifters are powered by a voltage Vcc which is typically greater than or equal to the voltage Vdd. The level shifter converts the logic levels received from the Schmidt triggers to be compatible with the circuitry powered by the voltage Vcc.

The above-described interface permits the electronic devices coupled to the serial communications bus to properly decode received data and clock signals without a direct electrical connection between the voltage Vdd and the respective electronic device. These and other advantages of the presently described invention will be apparent to those of ordinary skill in the art in view of the following Detailed Description of the Invention.

BRIEF DESCRIPTION OF THE SEVERAL VIEWS OF THE DRAWINGS

The invention will be more fully understood by reference to the following Detailed Description of the Invention in conjunction with the drawings of which.

DETAILED DESCRIPTION OF THE INVENTION

An improved interface to a serial communications bus having at least one serial communications line is described. In the illustrated embodiment, the at least one serial communications line is pulled up to a first DC voltage Vdd via a pull-up resistor and electronic devices coupled to the at least one serial communications line pull the serial communications line low using an open drain or open collector transistor driver. The disclosed interface permits an electronic device to utilize a DC voltage source that provides a DC voltage Vcc that is greater than or equal to the voltage Vdd without providing a separate voltage connection between the voltage Vdd and the interface integrated circuit within the respective electronic device coupled to the serial communications bus. While illustrated herein and discussed with respect to the applicability of the interface to the I²C bus, it should be appreciated that the presently described system and method for interfacing to a serial communications bus may be employed in other systems having serial communications lines that are pulled up to the voltage of a first DC voltage source through pull-up resistors when the serial communications line(s) are not active and pulled down by open drain or open collector drivers within attached devices when the drivers are active. The disclosed technique may also be employed with serial communications buses that have logic signals actively driven to both logic states.

Figure 1:
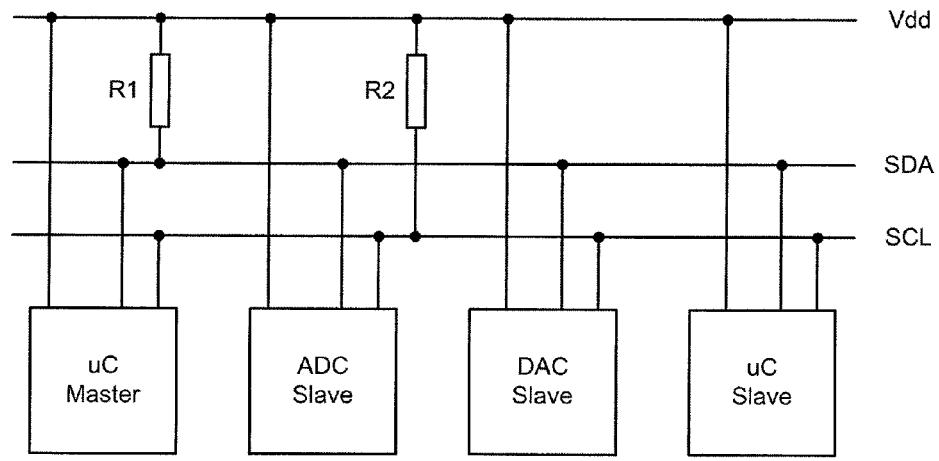
FIG. 1 is a block diagram of a prior art I²C serial communications bus.
Figure 2:
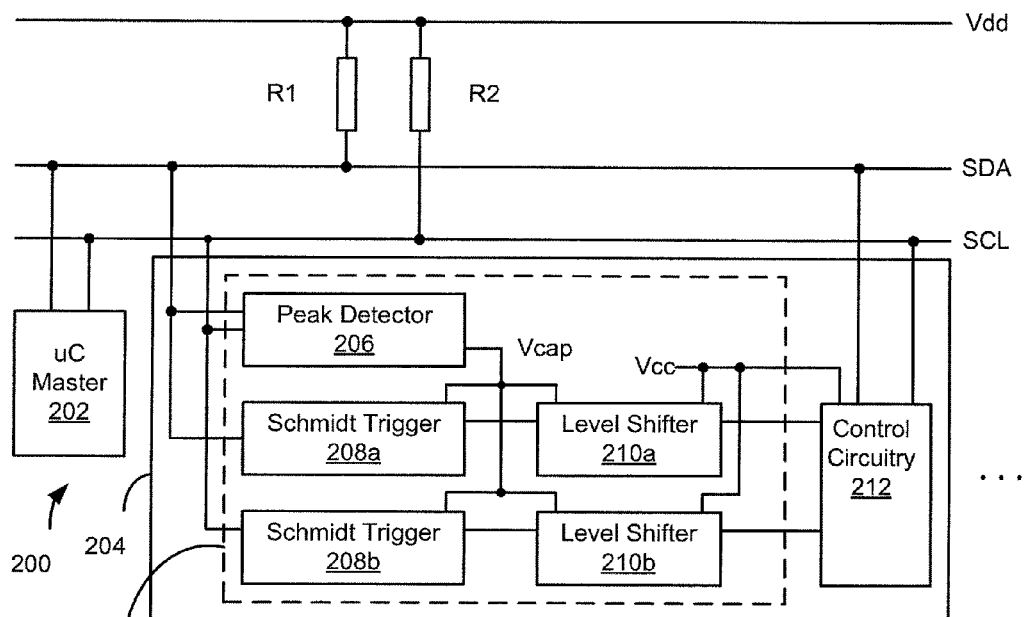
FIG. 2 is a block diagram of an interface to an I²C serial communications bus in accordance with the present invention.

A block diagram of an illustrative system 200 operative in accordance with the present invention is illustrated in FIG. 2. The illustrative system depicted in FIG. 2 is operative using the I²C protocol for serial communication. More specifically, the I²C bus includes a serial data line (SDA) and a serial clock line (SCL) which are pulled up to the voltage Vdd through pull-up resistors R1 and R2 respectively. The SDA and SCL serial communications lines are driven low by open drain or open collector transistors in electronic devices coupled to the SDA and SCL serial communications lines, such as electronic devices 202 and 204. Electronic devices coupled to the I²C bus include an interface 205 for receiving serial data transmitted over the SDA and SCL serial communications lines by other electronic devices coupled to the I²C bus.

The system depicted in FIG. 2 includes one or more master devices 202 and one or more slave devices 204. In the illustrative embodiment the master devices 202 and the slave devices 204 communicate with one another in accordance with the I²C protocol as known in the art.

The master devices and slave devices each employ at least one DC voltage source. Typically, the master devices 202 employ a power supply providing a voltage Vdd although the master devices may employ multiple supply voltages. The slave devices 204 typically employ one or more power supplies and provide a voltage Vcc utilized in the slave device 204 that is greater than or equal to the voltage Vdd. To properly decode the signals on the SCL and SDA lines of the serial communications bus, each of the electronic devices must know the voltage Vdd employed on the serial communications bus.

In one embodiment, the interface 205 to the serial communications bus includes a peak detector 206, Schmidt triggers 208a, 208b and level shifters 210a, 210b. The interface 205 ascertains the first DC voltage Vdd through the use of the peak detector 206 such as illustrated in the slave device 204.

The peak detector 206 is coupled to the SDA and SCL serial communications lines and employs transistors connected to the respective lines that are configured as source followers as subsequently described in greater detail to generate a voltage reference Vcap within the interface 205 which approximates the voltage Vdd.

The SDA serial communications line is coupled to a first Schmidt trigger 208a and the SCL serial communications line is coupled to a second Schmidt trigger 208b. The reference voltage Vcap generated by the peak detector 206 is coupled to the Schmidt triggers 208a, 208b to establish the approximate magnitude of the logic signals received by the respective Schmidt triggers over the SDA and SCL serial communications lines. The Schmidt triggers 208a, 208b provide thresholds for establishing logic 1s and 0s on the respective serial communications lines and provide outputs that are coupled to level shifters 210a, 210b respectively.

In the exemplary embodiment, the level shifters 210a, 210b receive logic signals at an input stage that utilize the reference voltage Vcap. The control circuitry 212 within the slave device 204, however, may operate from the voltage source Vcc that is greater than or equal to the voltage Vdd on the voltage rail of the I²C bus.

The level shifters 210a, 210b convert the logic signals from the logic voltages present on the I²C bus to those used internally by the control circuitry 212. Since, in the exemplary embodiment, the control circuitry 212 is powered by the voltage Vcc which is greater than the voltage Vdd, the level shifters convert the logic signals from the logic levels received from the SDA and SCL communications lines to logic levels compatible with the control circuitry 212. The control circuitry 212 includes open drain or open collector transistors that are coupled to the SDA and SCL serial communications lines to permit communications by the slave device 204 over the I²C bus with other connected devices.

Figure 3:
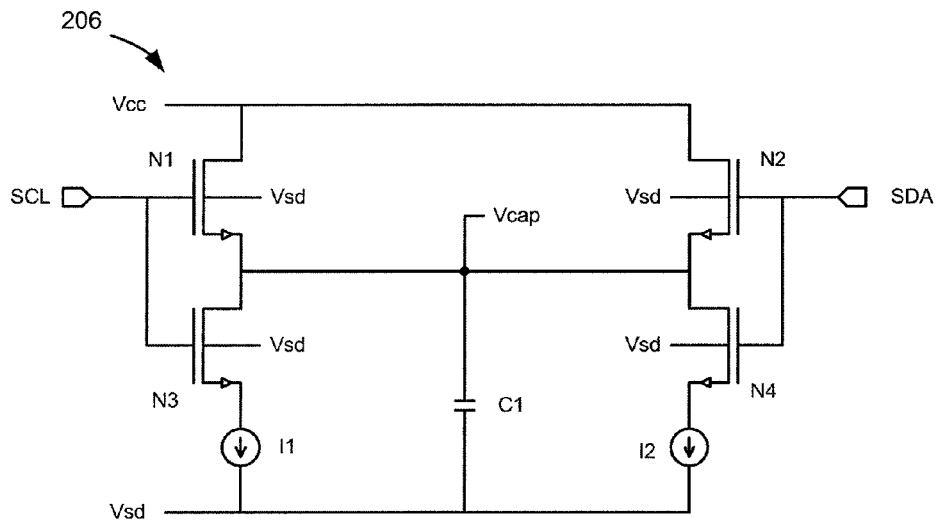
FIG. 3 is a schematic diagram of one embodiment of a peak detector that may be employed in the system illustrated in FIG. 2.

An exemplary schematic diagram of the peak detector 206 of FIG. 2 is illustrated in FIG. 3. The peak detector 206 utilizes the high logic levels appearing on the SCL and SDA serial communications lines which generally correspond to the voltage Vdd to produce a voltage Vcap which is substantially equal to and approximates the voltage Vdd.

More specifically, in the exemplary embodiment, the SCL and SDA logic signals are coupled to source follower NMOS transistors N1 and N2 respectively. To avoid having Vcap lower than Vdd by 0.5 volts –0.7 volts as might occur with certain transistor devices, transistors N1 and N2 may be native NMOS devices. The native NMOS devices provide a low voltage drop Vt between the gate and the source in a source follower arrangement. Native NMOS devices have a low Vt between the gate and source in the range of 0 to 100 millivolts and thus the voltage Vcap produced by the peak detector is within 100 my of the voltage Vdd with N1 and N2 operating as source followers in the presently disclosed arrangement.

The NMOS transistors charge a capacitor C1 to the reference voltage Vcap which is substantially equal to and approximates the voltage Vdd on the I²C bus. The voltage Vcap on the capacitor C1 provides a voltage reference for the Schmidt triggers 208a, 208b for interpretation of the logic levels of the logic signals on the serial communications line and is the supply voltage for the input stage to the level shifters 210a, 210b (FIG. 2). The Schmidt triggers establish logic levels based on the magnitude of the reference voltage Vcap. By way of example, and not limitation, the low logic level corresponds to a voltage below ⅓ of the voltage Vcap and the high logic level corresponds to a voltage above ⅔ of the voltage Vcap.

Small bleeder current sources I1 and I2 prevent overcharging of the capacitor C1 due to transients or spikes on the SCL and SDA serial communications lines above the Vdd voltage level. The NMOS switches N3 and N4 disable the current sources I1 and I2, respectively, when the logic signals on the SCL and SDA lines are low. In the illustrated embodiment, it has been found that the capacitor C1 may have a capacitance of several pF. It should be recognized however, that the size of the capacitor is a matter of design choice and may be varied to accommodate the requirements in interfaces to different serial communication systems. Moreover, a smaller capacitor may be employed by coupling the voltage Vcap to a unity buffer (not shown) to buffer the Vcap voltage and utilizing the buffered output from the unity buffer as the reference voltage for the Schmidt triggers 208a, 208b and input stages of the level shifters 210a, 210b.

While the illustrated peak detector 206 employs the logic signals appearing on both the SCL and SDA lines to generate Vcap, it should be recognized that the voltage Vcap may be generated using only a single logic signal on one serial communications line in conjunction with a suitably sized capacitor. It should further be recognized that any suitable peak detector that performs the functions of the presently described peak detector may be employed in lieu of the exemplary peak detector depicted in FIG. 3.

Figure 4:
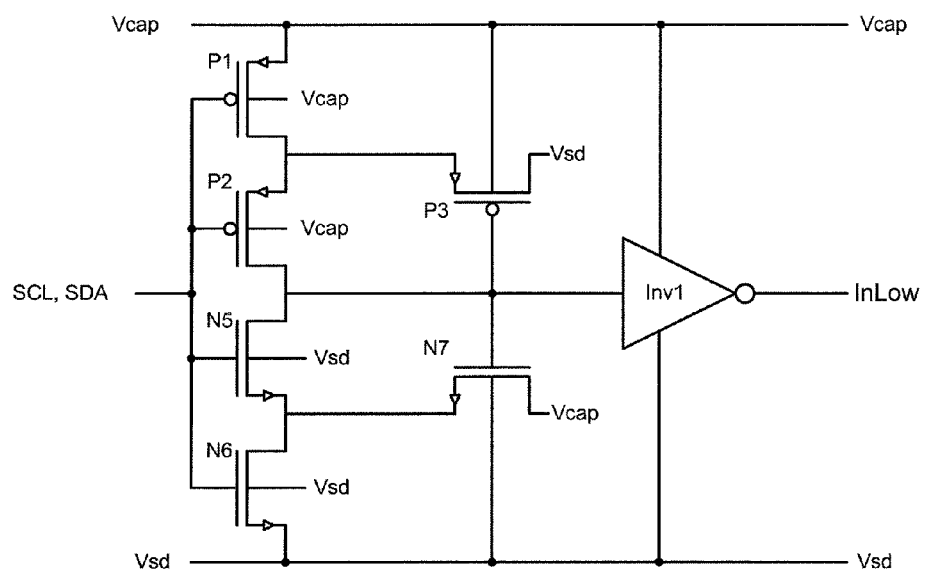
FIG. 4 is a schematic diagram of one embodiment of a Schmidt trigger that may be employed in the system illustrated in FIG. 2.

FIG. 4 illustrates an exemplary schematic diagram of a Schmidt trigger that may be employed as the Schmidt triggers 208a, 208b illustrated in FIG. 2. As noted above, the Schmidt triggers 208a, 208b are configured with hysteresis to provide noise immunity for received signals SCL and SDA. In one embodiment, the channel geometries of the transistors in the Schmidt triggers 208a, 208b are specified to achieve the above-specified logic thresholds, namely, a low threshold at approximately ⅓ of the voltage Vcap and a high threshold at approximately ⅔ of the voltage Vcap. The illustrated Schmidt trigger is an exemplary embodiment and it should be recognized that any suitable Schmidt trigger known in the art may be substituted for the illustrated embodiment.

Figure 5:
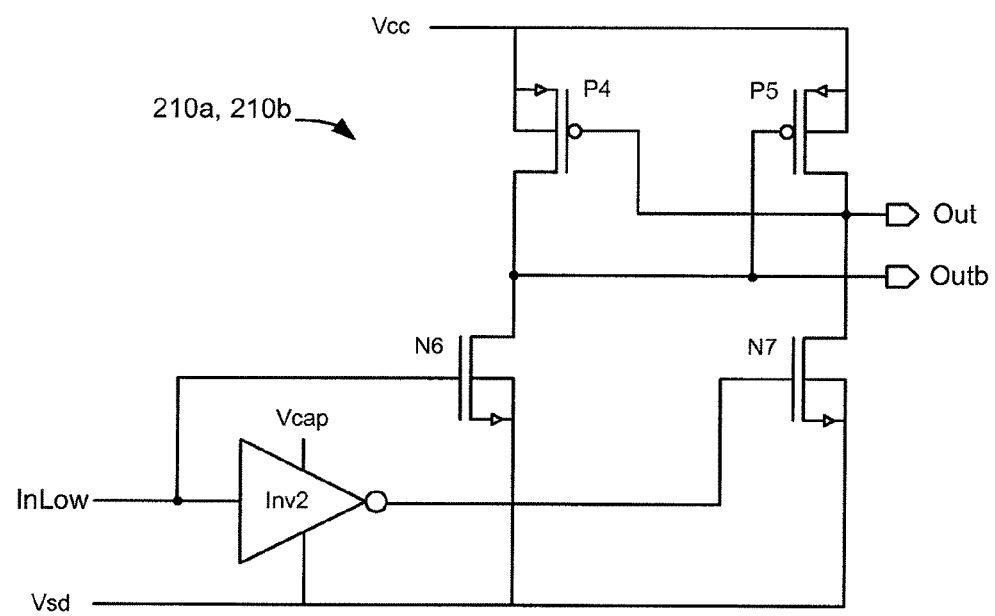
FIG. 5 is a schematic diagram of one embodiment of a level shifter that may be employed in the system illustrated in FIG. 2.

FIG. 5 depicts a schematic of an exemplary level shifter that may be employed for the level shifters 210a, 210b illustrated in FIG. 2. The level shifters 210a, 210b receive the outputs from the Schmidt triggers 208a, 210b respectively as illustrated in FIG. 2. The outputs InLow of the respective Schmidt triggers shown in FIG. 4 are coupled to the inputs of the inverting buffer Inv2 as shown in FIG. 5. The inverting buffer Inv2 receives logic levels that are comparable to the logic levels on the SCL and SDA serial lines. Consequently, the inverting buffer Inv2 is powered by the reference voltage Vcap.

The level shifters 210a, 210b convert the received logic levels from those on the SCL and SDA lines to logic levels used by the slave circuitry 212 (FIG. 2).

More specifically, the output stage of the level shifters 210a, 210b and the control circuitry 212 are coupled to the supply voltage Vcc. When the level shifters 210a, 210b receive an input logic signal InLow that is low, the input to NMOS transistor N6 is low and the output from the inverting buffer Inv2 is high. The output of the inverting buffer Inv2 is coupled to the gate of NMOS transistor N7 which turns on N7 pulling the output Out low. When the output Out is pulled low, PMOS transistor P4 is turned on pulling the level shifter output Outb high. Since the output stage of the level shifters 210a, 210b are coupled to Vcc, when either of the outputs Out or Outb are pulled high, they are pulled to a voltage approximately equal to Vcc.

When the level shifters 210a, 210b receive an input logic signal InLow that is high, i.e. approximately equal to Vcap, NMOS transistor N6 is turned on which pulls the output Outb low. The drain of NMOS transistor N6 is coupled to the gate of PMOS transistor P5. Consequently, when NMOS transistor N6 is turned on, PMOS transistor P5 is turned on pulling the level shifter 210a, 210b output Out high. The gate of PMOS transistor P4 is coupled to the output Out. Thus, when the output signal Out is pulled high, PMOS transistor P4 is turned off.

The NMOS devices N6, N7 have a larger drive capability than than the PMOS devices P4, P5 so they can overdrive the PMOS devices and force them into a new state.

In the foregoing manner, the logic levels appearing on the SCL and SDA lines are shifted to logic levels of generally 0 or Vcc for use by the control circuitry 212 within the slave device 204 (FIG. 2).

The control circuitry 212 within each electronic device connected to the serial communications bus is specified to perform functions associated with the specific device. The control circuitry 212 thus varies based on the particular functions associated with the respective device. The control circuitry 212 will typically include at least one processor and at least one memory wherein the processor is operative to perform programmed instructions out of the memory to accomplish the intended function of the circuitry 212. By way of example, and not limitation, the connected device may include a digital to analog converter, an analog to digital converter, a micro-controller programmed to perform a desired function or any other desired circuitry.

The control circuitry 212 includes driver transistors (not shown) that are coupled to the serial communications lines to drive the respective lines in accordance with the applicable communications protocol. In the illustrated I²C bus, the driver transistor are open drain or open collector devices that are coupled to the SCL and SDA serial communications lines. The control circuitry 212 is powered by the third voltage source Vcc as previously noted.

While the interface 205 has been described as being present within the slave device 204, the interface may be employed within the master 202 or in other devices connected to suitable serial communications buses.

Many devices that are connectable to a serial communications bus include a power down mode to minimize current drain when the device is not in use. When placed in the power down mode, most of the circuitry within the device is disabled so that power consumption is minimal. Typically parts exhibit less than 1 uA standby current when in the power down mode. When in this mode, however, some circuitry within the device must remain active to allow the device to be awakened in response to a command received over a serial communications bus. It is desirable, however, to provide a very low current drain when in the power down mode. In the illustrated embodiment, this is achieved in several ways.

Current sources, I1 and I2 illustrated in FIG. 3 are made as small as practical. These current sources are employed to stabilize the gate to source voltage of the low $V_t$ transistors N1 and N2. The current sources only need to be large enough to counteract leakage through N1 and N2. In one embodiment, current sources of 25 nano-amps were employed, however, smaller current sources may be used.

The use of the voltage $V_{cap}$ to power the Schmidt triggers and the level shifters requires that these circuits use a small amount of charge each time they have to transition between logic states. Thus, a value for capacitor C1 needs to be specified to control the amount of the voltage drop on the capacitor. As discussed previously, the voltage $V_{cap}$ may be buffered and the buffered voltage may be used to power the Schmidt triggers and the level shifters, however, it is recognized that the buffer would require additional current. If low power is not an overriding design objective, buffering the voltage Vcap with a unity buffer (not shown) allows the capacitor C1 to be of a smaller size.

The Schmidt triggers 208a, 208b may optionally be omitted in which case the SDA and SCL lines are connected to the inputs of the level shifters 210a, 210b. If the Schmidt triggers 208a, 208b are omitted, the noise immunity of the interface will be reduced.

It should be recognized that the inventive method and system described herein is applicable not only to interface circuits for coupling electronic devices to an I²C compatible bus but may be applied generally to interface circuits for coupling electronic devices to serial communications buses employing other protocols.

It should further be appreciated that modifications to and variations of the above-described methods and apparatus may be made without departing from the inventive concepts disclosed herein. Accordingly, the invention should not be viewed as limited except by the scope and spirit of the appended claims.

What is claimed is:

1. An electronic device communicably coupleable to a serial communications bus including a first serial communications line and a first DC voltage rail providing a first DC voltage, the first serial communications line having first logic signals imparted thereto via a first driver transistor included in another electronic device coupled to the first serial communications line, the electronic device comprising:
    a peak detector having a first peak detector input and a peak detector output, the first peak detector input coupleable to the first serial communications line and operative to generate from the first logic signals a second DC reference voltage at the peak detector output, the second DC reference voltage being substantially equal to the first DC voltage;
    a first level shifter having a first level shifter input and a first level shifter output, the first level shifter input communicably coupleable to the first serial communications line, wherein the first level shifter includes a first level shifter input stage coupled to the second DC reference voltage and a first level shifter output stage coupleable to and operative to be powered by a third DC voltage source providing a third DC voltage so as to produce first level shift output logic signals having magnitudes generally corresponding to the third DC voltage; and
    device circuitry providing a predetermined function and having a device circuitry input coupled to the first level shifter output, wherein the device circuitry is coupleable to and operative to be powered by the third dc voltage greater than or equal to the first DC voltage.

2. The electronic device of claim 1, wherein the second DC voltage generated by the peak detector is equal to the first DC voltage or within 100 millivolts of the first DC voltage.

3. The electronic device of claim 1 wherein said peak detector includes a first capacitor and wherein the peak detector input includes a first native NMOS transistor having a gate and a source, wherein the first native NMOS transistor is configured in a source follower arrangement with the gate coupleable to the first serial communications line and the source coupled to the capacitor so as to charge the capacitor in response to receipt of the first logic signals when the gate of the first native NMOS transistor is coupled to the first serial communications line.

4. The electronic device of claim 1 wherein the third DC voltage source provides a third DC voltage that is greater than or equal to the first DC voltage.

5. The electronic device of claim 1 further including a first Schmidt trigger having a first Schmidt trigger input and a first Schmidt trigger output, wherein the first Schmidt trigger input is coupleable to the first serial communications line and the first Schmidt trigger output is coupled to the first level shifter input.

6. The electronic device of claim 1 wherein the serial communications bus further includes a second serial communications line, wherein the first serial communications line is a serial clock line and the second serial communications line is a serial data line, wherein the serial communications bus includes first and second pull-up resistors coupled between the first and second serial communications lines respectively and the first voltage rail, the second serial communications line having logic signals imparted thereto via a third driver transistor, wherein the first and third driver transistors are operative to drive the first and second serial communication lines in an open drain configuration; and
    wherein the peak detector includes a second input coupleable to the second communications line and the peak detector is operative to generate the second DC voltage from the logic signals on the first and second serial communications lines.

7. The electronic device of claim 6 wherein said peak detector includes:
    a capacitor;
    a first NMOS transistor having a gate coupleable to the first serial communications line, the first transistor configured in a source follower arrangement with the first MOS transistor source coupled to a first end of the capacitor; and
    a second MOS transistor having a gate coupleable to the second serial communications line, the second transistor configured in a source follower arrangement with the second MOS transistor source coupled to the first end of the capacitor;
    wherein the first and second MOS transistors are operative to charge the capacitor to the second DC voltage.

8. The electronic device of claim 7 wherein the second DC voltage is equal to the first DC voltage or within 100 millivolts of the first DC voltage.

9. A method for powering an electronic device coupled to a serial communications bus including a first DC voltage rail providing a first DC voltage and a first serial communications line having first logic signals imparted thereto with first logic signal magnitudes substantially equal to the first DC voltage, the method comprising:
    in a first receiving step, receiving the first logic signals from the first serial communications line at a first peak detector input of a peak detector within the electronic device and generating from the first logic signals a peak detector output having a second DC reference voltage approximately equal to the first DC voltage;
    coupling the second DC reference voltage to an input stage of a first level shifter and powering an output stage of the first level shifter with a third DC voltage that is greater than or equal to the first DC voltage;

in a second receiving step, receiving the first logic signals at a first level shifter input within the input stage of the first level shifter and producing at a first level shifter output within the first level shifter output stage, first level shifter output signals corresponding to the first logic signals having magnitudes approximately equal to the magnitude of the third DC voltage;

coupling the third DC voltage to first electronic device control circuitry to power the first electronic device control circuitry;

receiving at first electronic device control circuitry the first level shifter output signals; and performing predetermined functions within the first electronic device control circuitry in response to receipt of the first level shifter output signals.

10. The method of claim 8 wherein the step of generating the peak detector output includes the steps of:

coupling a gate of a first transistor having a source and a drain to the first serial communications line;

coupling the drain of the first transistor to a third voltage source providing a third DC voltage that is equal to or greater than the first DC voltage, and coupling the source of the first transistor to a first end of a capacitor in a source follower configuration; and receiving the first logic signals at the gate of the first transistor and responsive thereto, charging the capacitor to approximately the first DC voltage;

wherein the voltage on the first end of the capacitor corresponds to the second DC voltage.

11. The method of claim 8 wherein the third DC voltage is greater than or equal to the first DC voltage.

12. The method of claim 9 wherein the serial communications bus further includes a second serial communications line having second logic signals thereon, the method further comprising:

receiving the second logic signals from the second serial communications line at a second peak detector input of the peak detector and generating from the first and second logic signals the peak detector output having the second DC voltage approximately equal to the first DC voltage;

powering an input stage of the second level shifter with the second DC voltage and powering an output stage of the second level shifter with the third DC voltage, wherein the second level shifter includes an input and an output;

receiving the second logic signals from the second communications line at the second level shifter input;

generating by the second level shifter at the second level shifter output, second level shifter output signals having magnitudes generally corresponding to the third DC voltage;

receiving at the electronic device control circuitry the second level shifter output signals; and performing predetermined functions within the first electronic device control circuitry in response to receipt of the first and second level shifter output signals.

13. The method of claim 12 wherein the first serial communications line is a serial clock line and the second serial communications line is a serial data line.

14. The method of claim 9 wherein the first receiving step comprises the step receiving the first logic signals at a gate of a native MOS transistor having a source coupled to a capacitor in a source follower configuration and charging the capacitor to the second DC voltage.

15. The method of claim 14, wherein the MOS transistor is a native NMOS transistor.

16. The method of claim 15, wherein said charging step comprises the step of charging the capacitor to a voltage in a range between the first DC voltage and a voltage within 100 millivolts of the first DC voltage.

17. An electronic device communicably coupleable to a serial communications bus including a first serial communications line and a first DC voltage rail for providing a first DC voltage, the first serial communications line having first logic signals imparted thereto via a first driver transistor included in another electronic device coupled to the first serial communications line, the electronic device comprising:

a peak detector having a peak detector input and a peak detector output, the first peak detector input coupleable to the first serial communications line and operative to generate from the first logic signals a second DC reference voltage at the peak detector output, the second DC voltage being substantially equal to the first DC voltage; and interface circuitry having an input stage including an interface circuitry input operative to receive the first logic signals and an output stage including an interface circuitry output, wherein the second DC reference voltage is coupled to the input stage to provide an indication of the magnitude of the first logic signals.

18. The electronic device of claim 17 further including:

control circuitry providing a predetermined function, the control circuitry having a control circuitry input stage having a control circuitry input coupled to the interface circuitry output, wherein the interface circuitry output stage and the control circuitry input stage are configured for operation from a third DC voltage greater than or equal to the first DC voltage.

19. The electronic device of claim 18 wherein the interface circuitry input has first and second logic level thresholds for establishing first and second logic states associated with the first logic signals received at the interface circuitry input and the first and second logic level thresholds are based at least in part on the second DC voltage.

* * * * *